United States Patent
Ooka

[11] 3,752,272
[45] Aug. 14, 1973

[54] FLOATING TYPE DISC BRAKE
[75] Inventor: Toshio Ooka, Itami City, Hyoga Prefecture, Japan
[73] Assignee: Sumitomo Electric Industries, Ltd., Osaka, Japan
[22] Filed: Dec. 21, 1970
[21] Appl. No.: 99,775

[30] Foreign Application Priority Data
Dec. 22, 1969 Japan............................ 44/103670
Apr. 8, 1970 Japan............................ 45/29866

[52] U.S. Cl.................. 188/345, 60/54.6 M, 92/63
[51] Int. Cl.............................................. B60t 11/10
[58] Field of Search............... 188/345, 106 P, 72.4, 188/370; 92/62, 63; 60/54.6 M

[56] References Cited
UNITED STATES PATENTS
2,694,191  11/1954  Falanga et al. ................. 188/345 X
3,465,852  9/1969  Belart ................................ 188/345
3,601,233  8/1971  Marshall et al. ..................... 188/345

*Primary Examiner*—George E. A. Halvosa
*Attorney*—Carothers & Carothers

[57] ABSTRACT

A floating type disc brake which is actuated by two separate braking pressure lines. This disc brake has friction pads which face each other with the two sides of the brake disc therebetween and a caliper which straddles over the said disc and which can float in the direction of the axis of revolution of the disc. On one side of this caliper with respect to the disc is provided a pressing mechanism which presses one of the friction pads against the friction surface of the disc. This pressing mechanism has one cylinder and two pistons. The two pistons are actuated by fluid pressure supplied from their respective braking pressure lines, and are connected with each other by a mechanical linking mechanism to prevent their separation from each other.

7 Claims, 4 Drawing Figures

INVENTOR.
TOSHIWO OOKA
BY
CAROTHERS & CAROTHERS
HIS ATTORNEYS

INVENTOR.
TOSHIWO OOKA
BY CAROTHERS & CAROTHERS
HIS ATTORNEYS

3,752,272

FLOATING TYPE DISC BRAKE

BACKGROUND OF THE INVENTION

1. Field of the Invention

This invention is related generally to the field of disc brakes for vehicles. The brake operates safely even when one of the braking pressure lines fails to operate, it being actuated by the other braking pressure line in such a case. Two pistons which are individually actuated by two separate braking pressure lines respectively are connected with each other by a mechanical linkage, so that it is not necessary to supply more braking fluid to the other pressure line if one of the braking pressure lines has incurred a leakage.

2. Description of Prior Art

British Pat. No. 951,906 published on Mar. 11, 1964, relates to a hydraulic brake for motor vehicles. It is described therein that the wheel brake cylinder contains two working chambers, each of which is connected to a separate pressure fluid line and that each of the chambers contains one piston, these pistons being so interconnected either hydraulically or mechanically that their actuating forces are additive.

However, the fabrication of an exceedingly high precision is required to obtain conformity between the sliding surfaces of the cylinder and two pistons used in that British Pat. No. 951,906, so that the manufacture is accompanied by great difficulty. Moreover, since the axial length of the connected pistons is long, the pistons become inclined or tilted together in relation to the pads when the friction pads become tilted, so that when the fluid pressure is removed, the piston fails to restore its original position because of slanting condition and continued pressing of the friction pads against the friction surface of the disc, resulting in unnecessary wear on the pads and rise in the temperature of the disc which may cause braking problems.

U.S. Pat. No. 2,497,438 granted on Feb. 14, 1950, on the other hand, teaches two separate pistons as in the present invention, so that it solves the problems of the fabrication difficulty and unnecessary wear on the friction pads. However, it has a shortcoming in that a large quantity of pressure fluid is required because the friction pad is pressed by the piston on one side without restricting the movement of the piston on the other side where leakage has occurred in the braking fluid line.

BRIEF DESCRIPTION OF THE DISCLOSURE

The present invention relates to a floating type disc brake which has two pistons of different outer diameters pressed individually by two separated braking pressure lines in a pressing mechanism which presses the braking friction pad on one side. It is characterized in that the above-mentioned two pistons are mechanically linked.

Because of this linkage, the distance between the two pistons is prevented from becoming longer even when leakage occurs in one of the braking fluid lines to the two pistons, so that it is not necessary that a large quantity of braking fluid be sent to the defective side from the braking fluid line on the side which remains in order.

For the aforementioned mechanical linkage, at least one of the contacting faces of the two pistons is formed substantially to be part of a spherical surface and an appropriate clearance is provided in the direction of the piston axis of the linkage, so that the axes of the pistons may be more or less inclined with respect to each other.

In consequence, these pistons allow mutual inclination between the sliding surfaces of the cylinder along which the pistons slide and the axes of the pistons. This results in an advantage that while the task of fabrication becomes easier, there takes place no unnecessary wear pressing the friction pads and the cylinder is smooth.

In addition to the above, this invention teaches the provision of two sealing rings on the surface of sliding engagement between the pistons and cylinders of the two separated braking fluid lines. If and when pressurized fluid finds its way between these sealing rings, an electric circuit is closed by that fluid pressure. Fluid leakage in one of the sealing rings can be thereby detected.

DETAILED DESCRIPTION OF THE INVENTION

Figure 1:
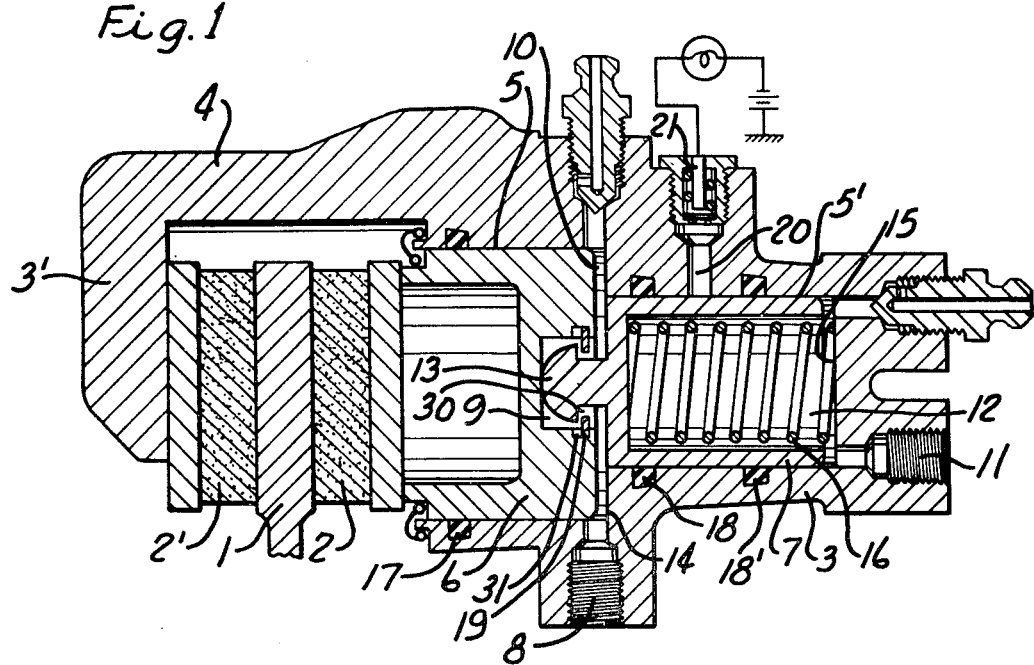
FIG. 1 is a side sectional view of a disc brake for motor vehicles which is an example of embodiment of this invention (view of a section cut by a plane containing the rotational axis of the disc, not shown in the Figure).

If a hydraulic braking device for motor vehicles should have a fault such as an oil leakage, it would fail to function if it has only one brake operation system. It is, therefore, already known to employ two hydraulic systems for brake operation with the thought of preventing this.

This invention is to provide a disc brake which is easy to manufacture for use with such dual hydraulic systems.

As disc brakes used with dual hydraulic systems, there are those known as the opposed type disc brake in which two pairs of pistons pressing friction pads by hydraulic pressure are provided on both sides of the disc and each pair is operated by a separate braking hydraulic system, and the floating type disc brake in which each leg of the caliper is capable of floating and is provided with a piston mechanism which is operated by a separate braking hydraulic system, so that the hydraulic system on the opposite side operates the disc brake when one of the hydraulic systems fails to operate. Also, British Pat. No. 951,906 teaches the use of one piston which is made operable by two separate braking hydraulic systems in order to attain the same object.

However, it is necessary to manufacture the piston with a high degree of precision if the construction shown by British Pat. No. 951,906 is to be manufactured, so that the fabrication is accompanied by difficulty. In addition, the contruction has a shortcoming in that the length of one piston in its axial direction becomes long, so that the piston is liable to become inclined by the braking torque generated at the time of braking.

U.S. Pat. No. 2,497,438, teaches the use of a piston divided into two disc-shaped pistons for the same purpose as this invention, so that it has an advantage that the length of the cylinder becomes shorter. However, since the two pistons are not mechanically linked with each other, of one of the braking fluid lines develops a leakage, the quantity of braking fluid supplied from the other braking fluid line increases, so that it becomes difficult to operate the brake safely.

This invention eliminates the above-mentioned shortcoming which occurs when the piston is divided into two parts in the axial direction. That is to say, it teaches two pistons or cylinders (hereinafter the mention of cylinders is omitted) which are individually pressed by the hydraulic pressure of two separate braking hydraulic systems respectively and which are movable in the same axial direction.

Where the constructions is such that the first piston presses the friction pad against the disc directly but the second piston presses the first piston and indirectly presses the friction pad via that pressed first piston, if a fluid leakage occurs in the braking fluid line to the second piston, the braking hydraulic pressure is still operable on the side of the first piston and causes the second piston to move farther away from the first piston. In such an instance, the first piston is still capable of continuing the braking operation regardless of the fault on the second piston side. However, it becomes imperative to supply an unnecessary quantity of fluid into the cylindrical to compensate for the greater distance of the second piston from the first piston. This gives rise to the shortcoming that an excessively long stroke of the brake pedal becomes necessary.

With the object of eliminating this shortcoming, this invention is characterized in that the two pistons are mechanically linked together in order to prevent the second piston from becoming relatively farther away from the first piston. The operation of this mechanical linkage will be made clear from the example description to be given later. However, it is not to be limited to the structure of these examples, but includes those which are of the same effect or suitable modifications that can be made by a person of ordinary skill in the art.

It is preferable that the clearance for the movement of the second piston in the axial direction with respect to the first piston, restricted by the aforementioned mechanical linkage, is made as amall as possible as long as it does not allow the aforementioned shortcoming to take place.

This is because the smaller the said clearance for the movement is, the shorter the required brake pedal stroke becomes in the case of a fault on the side of the second piston.

Now, three examples of the embodiment of this invention will be explained. The same numerals are given in the drawings to denote parts having the same function respectively.

In FIG. 1, reference numeral 1 denotes the disc to be braked which is fixed to the wheel coaxially with the wheel shaft. Friction pads 2, 2' face each other with their annular flat opposed faces on the opposite sides of the peripheral portion of the disc 1 disposed therebetween.

The floating caliper 4 which has two legs 3, 3' connected at the portion straddling the outer circumference of disc 1 and extending on the side of the wheel shaft (not shown in the drawing), is guided by a fixed member attached to a part of the vehicle just as in the case of the floating type disc brakes generally known, though not shown in the figure, in such a manner that it is movable in the axial direction of the wheel but not movable in other directions.

The two cylinders 5, 5' (in the case of example shown in FIG. 2, 5' corresponds to the guide piston 32) provided in one of the legs of the floating caliper 4 have the first piston 6 and the second piston 7 slidably attached thereto in a liquid-tight manner by means of piston seal rings respectively, the first piston 6 being in contact with the back plate of the inside pad 2. The first piston 6 presses the pad 2 against the disc, a pressure liquid being supplied to the chamber 9 and the chamber 10 via the inlet 8 from the first hydraulic system which obtains supply from, for example, a tandem master cylinder. It is further to be noted that although the pressure liquid in the chambers 9 and 10 presses the second piston 7 to the right, the pressure liquid supplied to the chamber 12 via the inlet 11 from the second hydraulic system presses this second piston to the lift so that an equillibrium is established on the second piston. In consequence, the second piston does not press the first piston.

By the reaction force of the first piston pressing against pad 2, the pressure liquid in chamber 10 presses the cylinder wall 14 and the pressure liquid in the chamber 12 presses the cylinder wall 15, whereby the caliper 4 moves to the right and presses the pad 2' provided on the leg 3' against the disc, thus operating the brake.

If the hydraulic pressure of the first hydraulic system fails to rise as a result of a fault and only the hydraulic pressure of the second hydraulic system rises, the pressing force is transmitted from the second piston via the first piston by the end part 13 of the second piston to press the pad 2 against the disc. The outside pad 2' is also pressed against the disc by the reaction force generated on the cylinder wall 15.

In this case, the force which presses the friction pads 2, 2' is generated by the hydraulic pressure in chamber 12 applied to the cross sectional area of the second piston and to the cylinder wall 15. As can be seen from FIG. 1, therefore, the cross sectional area of the second piston is made about one half of the cross sectional area of the first piston, so that if only the hydraulic pressure of the first hydraulic system fails to rise, the pressing force applied to the friction pads comes down to about one-half of the force applied when the first hydraulic system is also in order.

When the two hydraulic systems are both in order, if the first piston is pressed and moved to the left as already stated, a gap occurs between the first piston and the end part 13 of the second piston which remains stationary because the hydraulic pressure of the first hydraulic system and the hydraulic pressure of the second hydraulic system are equal. When the hydraulic pressure of the first hydraulic system becomes lower than the hydraulic pressure of the second hydraulic system, therefore, the second piston moves to the left because of the difference in pressure, necessitating a longer brake pedal stroke. To eliminate this drawback, it is desirable to have the end part 13 in butting contact with the first piston at all times.

This purpose is also served if a little higher hydraulic pressure than that of the first piston is distributed to the second piston. It is more preferable to install a compression spring 16 between the wall 15 and the right wall of the second piston to keep the end part 13 in butting contact with the first piston.

In case the hydraulic pressure of the second hydraulic system fails to rise and only the hydraulic pressure of the first hydraulic system rises, the pressure liquid in chamber 10 applies to the second piston such a force that hydraulic pressure working on the cross section of the second piston sealed with the sealing rings 18, 18' overcomes the force of the spring 16 and brings about movement to the right.

Also, in this case, the hydraulic pressure of the first hydraulic system in the chamber 9 utilized to press the first piston applies to the cross sectional area of the first piston minus the cross sectional area of the second piston, so that the force pressing the friction pads comes down to about one half of that as when the two systems are in order.

Generally, in case the disc brake of this invention is provided on the front wheels of a vehicle having front and rear wheel shafts and only one of the braking hydraulic systems is provided for the rear wheels, it is desirable for the alleviation of the skidding of the rear wheels such that when one of the braking hydraulic systems becomes out of order, the braking of the front wheel will be about one-half of the braking available when the systems are both in order. From this point of view, it is advisable to make the working area for the hydraulic pressure on the second piston 50 – 40 percent of the area of the hydraulic pressure working on the first piston.

Now, as a result of the movement to the right of the second piston caused by the hydraulic pressure in the chambers 9 and 10, the capacity of the chamber 10 increases and the brake pedal stroke proportionately increases as required by this increase in the capacity. In order to eliminate this drawback, the invention in the example of embodiment shown in FIG. 1 provides a flange 30 in the end part 13 of the second piston. After this is inserted into the chamber 9 in the first chamber, a snap ring 19 is placed in groove 31 provided in the circumferential inner wall of the chamber 9 to prevent the flange 30 from dislodging from chamber 9 to the right.

In the example of embodiment shown in FIG. 1, as mentioned above, the axial movement of the end part 13 with respect to the first piston is minimized by means of the left side wall of the chamber 9 of the first piston and snap ring 19, thereby obtaining substantially the same effects as those described in British Pat. No. 951,906 as mentioned in the beginning part of this specification.

Furthermore, even if the first piston becomes inclined or tilted due to some cause or other, the surface of the end part 13 which is in butting contact with the first piston is made substantially spherical and a gap is provided between the surfaces of the flange 30 facing the snap ring 19, so that the second piston is not caused to be tilted by the first piston in its cylinder.

In the case of the floating type disc brake operated by two braking hydraulic pressure systems provided with piston mechanisms in the legs of a floating caliper already known to the public as mentioned at the beginning of this specification, when the first hydraulic system has reduced pressure, an excessive volume of pressure liquid has to be supplied from the second hydraulic system is pushed back to the cylinder bottom by the hydraulic pressure of the second hydraulic system and comes to a stop. To overcome this drawback, it calls for a complicated mechanism to stop the backing of the piston of the first hydraulic system. In the case of this invention, however, complete operation is insured even when the pads 2 and 2' have become thin through wear by means of a simple linkage mechanism such as the aforementioned snap ring.

Figure 2:
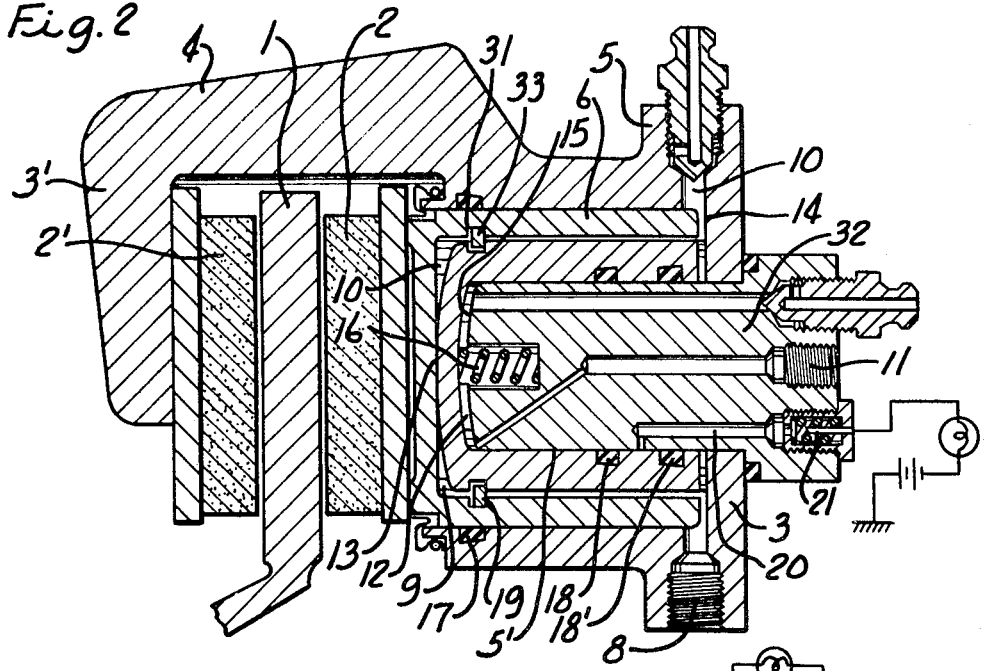
FIG. 2 and FIG. 3 show other examples of embodiment, both being side sectional views similar to FIG. 1.

The example shown in FIG. 2 shows an improvement of the example shown in FIG. 1 in order to make the axial length of the cylinder shorter. In this example, a guide piston 32 is fixed to the leg 5, screwed air-tight with a sealing ring therebetween, and the piston 7 is fitted on its outer circumference movably in the axial direction.

The pressure liquid of the second hydraulic system is supplied from the inlet 11 provided in the piston 32, and the pressure liquid reaches the chamber 12 in the cylinder to press the piston 7 causing it to move to the left.

In a manner similar to that of the second piston 7 of FIG. 1, this piston 7 has its end part 13 inserted in the inner chamber 9 of the first piston 6 and is prevented by means of the snap ring 19 from moving out to the right.

This snap ring 19 is fitted into bridge the annular groove 31 provided in the inner wall of the piston 7 and the annular groove 33 provided in the outer circumference of the piston 7, and restricts the mutual movement of the first piston 6 and the second piston 7 with a constant clearance. The second piston 7 is thus prevented from being removed away from the first piston when the second hydraulic system has become out of order and, also the first piston can be presses against the friction pad via this snap ring when the first hydraulic system has become out of order, thereby obtaining the objects of this invention.

In the example shown in FIG. 2 and the example in FIG. 3 to be explained later, the end part 13 of the second piston is not necessarily required to be positioned near the first piston.

In the example of FIG. 2, the first cylinder 5 and the guide piston 32 are coaxially placed one upon the other, so that their length in the axial direction is short. However, their functions are the same as those of the example shown in FIG. 1. Their detailed explanation is therefore omitted.

Figure 3:
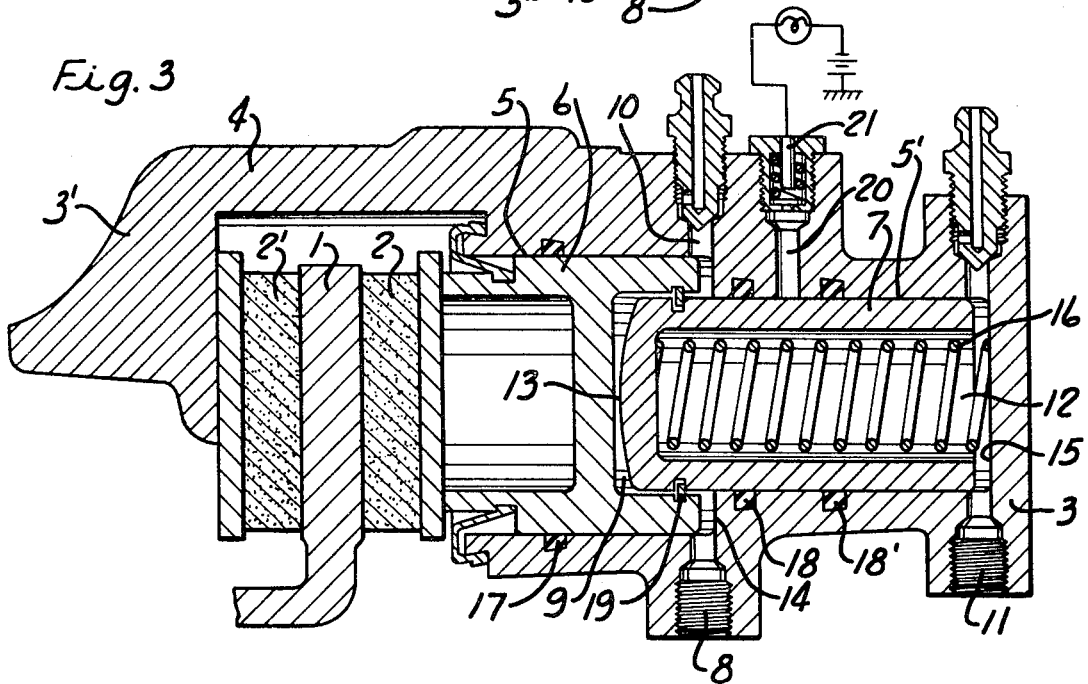

The example shown in FIG. 3, is a variation of the example shown in FIG. 1. As in the example shown in FIG. 2, here it is easy to fabricate the end part 13 of the second piston 7.

The snap ring 19 also has the same function as in the example shown in FIG. 2. It functions as the backstop of this invention which prevents the piston from being forced back unnecessarily into the chamber connected to one of the hydraulic systems which has become out of order.

In the above-mentioned three examples, the first piston 6 and the second piston 7 have sealing rings 17, 18, and 18' on the floating caliper 7, so that their resistance to sliding prevents these pistons or cylinder from moving farther than necessary from the disc when the braking pressure is removed. It is for this reason that the double ring seal is superior to the ordinary piston mechanism which has one seal ring.

In the afore-mentioned three examples, two seal rings 18 and 18' engage the sliding guide surface 5' of the second piston 7, and a pressure-electricity conversion device 21 is provided at the other end of the passage 20 which connects with the sliding surface of the second piston interposed between these seal rings 18 and 18'.

The seal rings 18 and 18' and passage 20 function in the same way as those of U.S. Pat. No. 3,477,549. That is to say, even if the seal rings 18 and 18' lose their sealing function and the two braking hydraulic systems become connected with each other along the cylinder surface 5', both the first and the second pistons function in a normal way. If leakage occurs in one of the braking hydraulic systems under such conditions, the other braking hydraulic system also leaks through the seal of seal rings 18 and 18'. According to the said U.S. Pat. No. 3,477,549, the oil which leaks from the passage 20 in this situation is visually inspected to detect the fault. According to the present invention, however, it is so devised that if leakage occurs in at least one of the seal rings 18 and 18', the braking hydraulic pressure is transmitted to the passage 20 and an electric signal is switched on by the force of the hydraulic pressure. It is thus made possible to inform the driver of the motor vehicle of the fault even while the vehicle is running and brakable.

Figure 4:
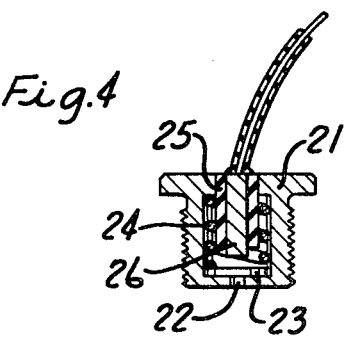
FIG. 4 is a sectional view showing the details of the device for detecting the leakage of pressure fluid from one of the sealing rings in the above-mentioned examples of embodiment.

FIG. 4 shows an example of the afore-mentioned pressure-electricity conversion device. Through the hole 22, the leakage fluid pressure causes the metallic piston 23, movable along the cylinder, to overcome the repelling force of the spring 24 and recede to contact the electrode 26 fixed to the cylinder housing 21 with electric insulation 25.

As shown in FIGS. 1 – 3, the fault alarm lamp is lit as this electrode 26 and piston 23 close the electric circuit, the one end of which is grounded to the body of the vehicle.

In regard to the above-mentioned pressure-electricity conversion device, it goes without saying that this invention includes modifications easily made by a person of ordinary skill, such as the use of a pressure-sensitive semiconductor known to the public installed in the passage 20.

I claim:

1. A fluid-operated disc brake actuator for disc brakes operated by a dual fluid braking system comprising a first cylinder, a brake operating piston in said cylinder, a second cylinder communicating with said first cylinder and having its axis parallel therewith, a second piston in said second cylinder, each of said cylinders having an independent fluid passage for the delivery of fluid under pressure on the opposite sides of and separated by said second piston, characterized by mechanical linking means axially connecting said pistons together to prevent them from axially separating in either direction such that each piston will be caused to move in the same axial direction as the other piston upon displacement without separation therebetween under all conditions of operation but allowing minimal relative axial and radial clearance in the connection to enable axial misalignment of the pistons.

2. The fluid-operated disc brake actuator of claim 1 wherein the cross-sectional area of said second piston pressed by the braking fluid pressure existing between said pistons is 50 – 40 percent of that of said first piston.

3. The fluid-operated disc brake actuator of claim 1 wherein said mechanical linking means consists of a cavity in one piston receiving a protrusion therein of the other piston, and retaining means operable to retain said protrusion in said cavity with said minimal clearances thereby preventing axial separation of said pistons while allowing piston mislignment.

4. A disc brake operated by fluid pressure from two independent fluid pressure lines comprising a rotatable brake disc, a brake member straddling said disc and operable to converge two brake friction pads on opposite sides of said disc toward each other into braking engagement with said disc by displacing at least one of said pads with a piston slidably received within a non-rotatable housing and operable with fluid under pressure from a first fluid pressure line, a second piston slidably received within said non-rotatable housing in axial alignment with said first piston and having one end exposed to the fluid pressure from the first fluid pressure line and the other end exposed to fluid under pressure from a second independent fluid pressure line, mechanical linkage means mechanically connecting said pistons together to prevent them from axially separating in either direction such that each piston will be caused to move in the same axial direction as the other piston upon displacement without separation therebetween under all conditions of operation but allowing minimal relative axial and radial clearance in the connection to enable relative axial misalignment of said pistons.

5. The disc brake of claim 4 wherein at least one of the axial contacting surfaces of said pistons provided by said mechanical linkage means is a convex surface.

6. The disc brake of claim 4 wherein said mechanical linkage means consists of a snap ring which fits with a slight clearance in opposed annular grooves on confronting annular surfaces of said pistons to provide said slight relative axial and radial clearance.

7. The disc brake of claim 4 which is characterized in that the cross-sectional area of said second piston pressed by the braking fluid pressure from said first line is made 50 – 40 percent of the cross-sectional area of said first piston pressed by the braking fluid pressure from said first line.

* * * * *

UNITED STATES PATENT OFFICE
CERTIFICATE OF CORRECTION

Patent No. 3,752,272     Dated August 14, 1973

Inventor(s) Toshiwo Ooka

It is certified that error appears in the above-identified patent and that said Letters Patent are hereby corrected as shown below:

Title Page, change the Inventor's Name from

"Toshio Ooka" to "Toshiwo Ooka"

Signed and sealed this 27th day of November 1973.

(SEAL)
Attest:

EDWARD M. FLETCHER, JR.         RENE D. TEGTMEYER
Attesting Officer               Acting Commissioner of Patents